Oct. 19, 1948.  R. J. SLAVSKY ET AL  2,451,581
PRICE TAG MOLDING HAVING A SLIDE HELD
TAG AND A TRANSPARENT COVER STRIP
Filed June 14, 1947
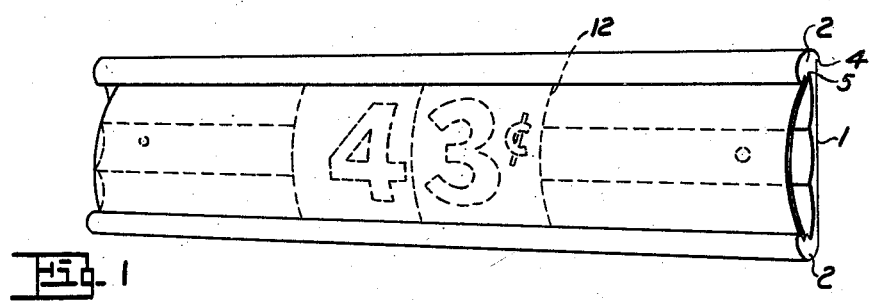
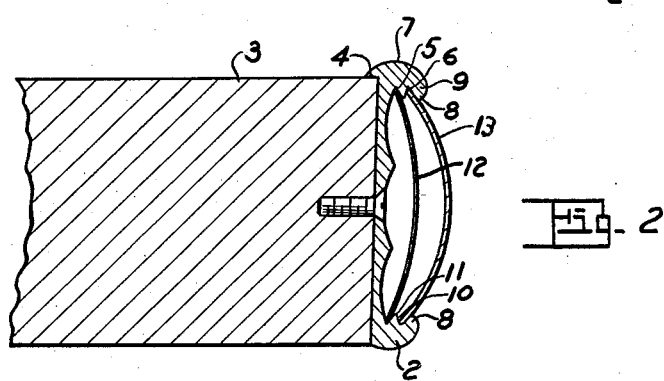
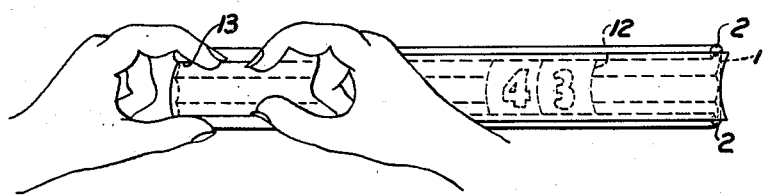
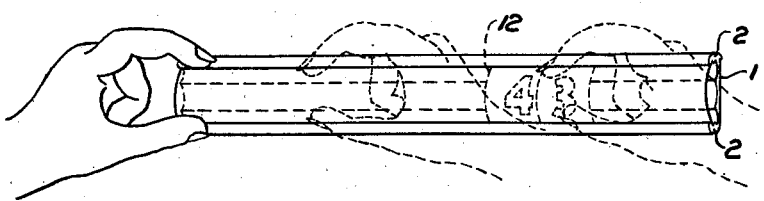
INVENTORS.
ROBERT J. SLAVSKY.
JOHN R. SLAVSKY.
BY
Samuel Weisman
ATTORNEY.

Patented Oct. 19, 1948

2,451,581

UNITED STATES PATENT OFFICE 2,451,581

PRICE TAG MOLDING HAVING A SLIDE HELD TAG AND A TRANSPARENT COVER STRIP

Robert J. Slavsky and John R. Slavsky, Detroit, Mich., assignors to Shaw and Slavsky, Inc., Detroit, Mich., a corporation of Michigan Application June 14, 1947, Serial No. 754,654

3 Claims. (Cl. 40—16)

The present invention pertains to a novel price tag molding designed primarily for use in grocery stores but also useful in other stores where goods are displayed on shelves. The molding is generally of a channel cross section and receives price tags inserted therein. The molding itself is attached to the forward edge of the shelf.

Experience with this system shows that mischievous persons frequently run their fingers along the strips and thereby move the tags out of proper position or accumulate them in a bunch. The general object of the present invention is to provide an arrangement that overcomes this difficulty.

It has been proposed to cover the price tags with transparent protective strips or shields held in the same molding. One of the requirements is that the shield shall not be movable, for otherwise the prankster will still have access to the price tags. The relatively complicated construction for securing the shields in place has made them unacceptable to the stores.

The present invention involves the use of a transparent strip inserted over the price tags in the molding. The transparent strip covers the entire length of the molding so that it cannot be displaced to expose the tags. If necessary, several lengths in end abutting relation are provided. A particular object of the invention is to provide a molding that permits insertion of the long transparent strips in an easy manner.

In the accomplishment of these objects, the molding includes an elongated strip and a wall at each longitudinal edge to form a channel. The inner surface of each wall is formed with a pair of longitudinal grooves, one to receive the price tags and the other to receive the transparent protective strip. The latter, in being inserted and pulled out, will become torn at the edges unless there is provided a special construction to avoid this damage. Accordingly, the invention provides a rounded edge or surface at the part of the channel engaged by the edges of the transparent strip in being inserted and withdrawn.

Another object of the invention is to provide a construction that permits insertion of the transparent strip by an easy manual operation. At one end, the strip is inserted in the corresponding groove. The thumb and forefinger of one hand are then run along the edges of the strip with slight pressure, and the edges of the strip are thereby automatically inserted in the grooves. The side walls of the channel in this area are of a form to prevent the fingers and also the edges of the transparent strip from slipping outward or over the channel. Also, the structure in the vicinity of the grooves is such that the edges of the transparent strip will not slip into the grooves intended for the price tags.

The invention is fully disclosed by way of example in the following description and in the accompanying drawings in which:

Figure 1 is a perspective view of the device;

Figure 2 is a cross section of the device supplied to a shelf;

Figure 3 is a perspective view illustrating the manner of inserting one end of the protective strip, and Figure 4 is a perspective view showing the manner of inserting the remainder of the strip.

Reference to these views will now be made by use of like characters which are employed to designate corresponding parts throughout.

The molding for receiving the price tags includes an elongated base strip 1 and a wall 2 at each of the longitudinal edges, thereby forming a channel. The channel, modified by the various shapes described hereinafter, is preferably formed by the extrusion process from a suitable metal such as aluminum. The strip 1 is placed against the forward vertical edge of the shelf 3, with the side walls 2 extending forward or outward. The upper wall 2 is extended rearwardly at 4 to rest upon the shelf for a purpose that will presently be described.

The inner surface of each of the walls 2 is formed with an inner longitudinal groove 5 and an outer longitudinal groove 6. The outer surface of each wall 2 is convex as indicated by the numeral 7, and in the case of the upper wall, this surface extends to the free end of the extension 4. When the extension 4 rests upon the shelf for properly locating the channel, the upper convex surface 7 permits easy cleaning of the corner.

It will be seen that the convex surface 7 in each case extends to the nearer wall of the nearer or outer groove 6. Moreover, the edge formed by this wall and the corresponding surface 7 is rounded at 8 for a purpose that will presently be described. A substantial bead or thickness of metal 9 is maintained between each surface 7 and the adjacent groove 6 for another purpose that will presently appear. The grooves 6 are of substantial depth, and the wall 10 lying between each groove 6 and the adjacent groove 5 forms a rather sharp edge 11.

In the use of the device, the price tags 12 are inserted in the grooves 5 in the usual manner. In order to prevent access to the price tags so that they will not be willfully displaced, an elongated protective transparent strip 13 is inserted in the grooves 6. The strip may be as long as the shelf itself between partitions, or if this is unwieldy, a length of two or three feet may be used. In either case the entire length of molding is covered by alined lengths of strips in end to end relation and in mutual abutment leaving no conspicuous open joints.

In applying a transparent strip, one end is bent or pinched transversely, for example, by the thumb and forefinger of the left hand, for insertion in the opposed grooves 6. At this time the remainder of the strip has not yet been inserted in the grooves. The thumb and forefinger of the right hand, as shown in Figure 4, are then run along the edges of the strip 13 with slight pressure which is sufficient to enter the edges of the strip 13 into the grooves 6 as the hand moves along. In this movement, the thumb and forefinger are guided by the walls 2. The described substantial thickness 9 at the nose or bead of each wall is such that the thumb and forefinger will not slip over the walls but will hold and guide them so that a swift and easy movement of the right hand is feasible.

The rounded edges 8 cause the edges of the strip 13 to ride easily into the grooves 6. In addition, if the edges 8 were sharp, the edges of the strip 13 would become nicked and torn while being inserted or withdrawn from the grooves 6. This is especially true of the plastic material which is economical and desirable for the strips 13.

By the same token, a rounded edge between adjacent grooves 6 and 5 would occasionally cause the edges of the strip 13 to pass into the grooves 5 unless inserted with great care. However, a fast and simple inserting movement is desired and it is therefore important to avoid such slippage. Consequently the walls 10 between adjacent grooves are formed with sharp exposed edges 11 which do not facilitate such slippage. The price tags 12, being flexed along the entire length on insertion, are not dragged across the edges 11 and consequently are not injured by them.

The grooves 6 are of substantial depth so that the strip 13 is not easily removed except by the proper method. This consists in inserting a pencil or the finger under one end of the strip and then pulling outward. However, unauthorized access to the ends is not readily suggested to mischief makers since the ends of adjacent strips are in abutting relation to each other as previously set forth.

Although a specific embodiment of the invention has been illustrated and described, it will be understood that various alterations in the details of construction may be made without departing from the scope of the invention as indicated by the appended claims.

What we claim is:

1. A price tag molding comprising an elongated strip having a back wall and an edge wall extending longitudinally and laterally of each of the upper and lower edges of said back wall to provide upper and lower channel walls, each of said edge walls having longitudinal inner and outer grooves in the inner surface thereof to receive price and cover strips, respectively, of substantially the same width, the outer surface of each edge wall being convex and extending to the outer side of the corresponding outer groove, said outer surface continuing and merging convexly into the outer side of said corresponding groove, the wall portion of each strip between said inner and outer grooves having a sharp exposed longitudinal edge, said sharp-edged wall portion being in proximity to and directly behind the corresponding convex edge wall, said convex surfaces facilitating the insertion of a flexible cover strip into said outer grooves and said sharp edges preventing such a strip from slipping into the inner grooves.

2. A price tag molding comprising an elongated strip having a back wall and an edge wall extending longitudinally and laterally of each of the upper and lower edges of said back wall to provide upper and lower channel walls, each of said edge walls having longitudinal inner and outer grooves in the inner surface thereof to receive price and cover strips, respectively, of substantially the same width, the outer surface of each edge wall being convex and extending to the outer side of the corresponding outer groove, said outer surface continuing and merging convexly into the outer side of said corresponding groove, the wall portion of each strip between said inner and outer grooves having a sharp exposed longitudinal edge, said sharp-edged wall portion being in proximity to and directly behind the corresponding convex edge wall, said convex surfaces facilitating the insertion of a flexible cover strip into said outer grooves and said sharp edges preventing such a strip from slipping into the inner grooves, said convex surfaces extending beyond the adjacent sharp edges in the direction toward the longitudinal center of said longitudinal strip, whereby to conceal said edges at eye level.

3. A price tag molding comprising an elongated strip having a back wall and an edge wall extending longitudinally and laterally of each of the upper and lower edges of said back wall to provide upper and lower channel walls, each of said edge walls having longitudinal inner and outer grooves in the inner surface thereof to receive price and cover strips, respectively, of substantially the same width, the outer surface of each edge wall being convex and extending to the outer side of the corresponding outer groove, said outer surface continuing and merging convexly into the outer side of said corresponding groove, the wall portion of each strip between said inner and outer grooves having a sharp exposed longitudinal edge, said sharp-edged wall portion being in proximity to and directly behind the corresponding convex edge wall, said convex surfaces facilitating the insertion of a flexible cover strip into said outer grooves and said sharp edges preventing such a strip from slipping into the inner grooves, and a longitudinal extension on one of said edge walls and lying externally of the channel formed by said back wall and edge walls, for mounting the molding on a horizontal surface.

ROBERT J. SLAVSKY.
JOHN R. SLAVSKY.

REFERENCES CITED

The following references are of record in the file of this patent:

UNITED STATES PATENTS

| Number | Name | Date |
| --- | --- | --- |
| 1,259,337 | Agnew | Mar. 12, 1918 |
| 1,902,769 | Esdorn | Mar. 21, 1933 |
| 1,943,168 | Doppel | Jan. 9, 1934 |
| 2,043,760 | Marsh | June 9, 1936 |
| 2,186,698 | Hopp | Jan. 9, 1940 |
| 2,190,958 | Vander Clute | Feb. 20, 1940 |
| 2,317,192 | Hopp | Apr. 20, 1943 |
| 2,353,469 | Hopp | July 11, 1944 |
| 2,362,273 | Hopp | Nov. 7, 1944 |